United States Patent

[11] 3,634,017

[72] Inventor Norbert Ottawa
 Frankfurt am Main, Germany
[21] Appl. No. 782,725
[22] Filed Dec. 10, 1968
[45] Patented Jan. 11, 1972
[73] Assignee Farbwerke Hoechst Aktiengesellschaft
 vormals Meister Lucius & Bruning
 Frankfurt am Main, Germany
[32] Priority Sept. 27, 1968
[33] Germany
[31] P 17 94 248.2

[54] OXAZINE DYE CONCENTRATE WITH POLYETHYLENE OXIDE
 2 Claims, No Drawings

[52] U.S. Cl. .................................................. 8/93
[51] Int. Cl. ............................................ C09b 67/00
[50] Field of Search ................................. 8/93, 21, 31, DIG. 7

[56]  References Cited
 UNITED STATES PATENTS

| 2,764,466 | 9/1956 | Bigood | 8/177 AB |
| 2,828,180 | 3/1958 | Sertorio | 8/62 |
| 2,922,690 | 1/1960 | Mueller et al. | 8/21 |
| 1,970,578 | 8/1934 | Schoeller et al. | 260/98 |
| 3,346,322 | 10/1967 | Finkenauer et al. | 8/79 |

FOREIGN PATENTS

| 981,547 | 1/1965 | Great Britain | 8/92 |
| 1,054,746 | 1/1967 | Great Britain | 8/93 |

OTHER REFERENCES

Colour Index, 2nd Edition, Vol. 3, pages 3423 & 3424, pub. by The Soc. of Dyers & Col. and The Amer. Assoc. of Tex. Chem. & Col. 1956.

Primary Examiner—Donald Levy
Attorney—Curtis, Morris & Safford

ABSTRACT: Stable, concentrated, aqueous solutions of basic oxazine dyestuffs of the formula

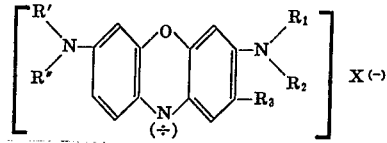

in which R' and R'' represent lower alkyl groups, $R_1$ and $R_2$ represent hydrogen atoms or lower alkyl groups or phenyl unsubstituted or substituted in the benzene nucleus by methyl, methoxy or ethoxy groups, $R_3$ represents hydrogen or methyl, and $X^-$ represents a halogen ion, consisting essentially of (a) the hydrochlorides of the said oxazine dyestuffs and (b) high molecular polyglycols in an amount of about 2 to about 20 percent by weight calculated on the weight of the dyestuff.

OXAZINE DYE CONCENTRATE WITH POLYETHYLENE OXIDE

The present invention provides stable concentrated aqueous solutions of basic oxazine dyestuffs. In the paper, textiles and leather industry, basic dyestuffs of the azine, oxazine, acridine, triphenyl-methane or thiazine series are used in the form of aqueous solutions. In general, said solutions are prepared from the sparingly soluble trichlorozincate salts or chlorozinc double salts of the mentioned dyestuffs which have been ground, previously, to fine powders. However, this application method entails major drawbacks. Thus, for example handling the water-soluble dyestuff powders of intense coloration raises considerable clouds of dust resulting into dirt and disturbing irritation. Furthermore, an inadequate storage, by action of humidity and heat, leads to agglomeration and hence to an impaired solubility.

These drawbacks entailed in the use of the finely pulverized basic dyestuffs may be obviated by applying concentrated solutions that are furnished by the dyestuff producer.

In German Pat. Nos. 95 828 and 101 273 solutions of basic dyestuffs in lactic acid are proposed. Those, however, yield but relatively low-concentrated solutions. In literature yet other methods are set forth enabling the obtention of concentrated solutions of basic dyestuffs from salts of water-soluble carboxylic acids (cf. "Die neuesten Fortschritte in der Anwendung der Farbstoffe" (1949) vol. II, pp. 132–134: Zeitschrift für angewandte Chemie, 1898, pp. 482–488 and 501–505; German specification No. 1 240 036 laid open to public inspection). This specification explicitly states that the usually employed salts of basic dyestuffs—in many cases the hydrochlorides—dissolve in water or another appropriate liquid at a relatively low concentration, particularly at room temperature (cf. column 1, lines 35 to 40).

Now, it has been found that stable, concentrated aqueous solutions of basic oxazine dyestuffs of the general formula

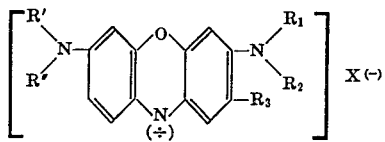

wherein R' and R" stand for lower alkyl, $R_1$ and $R_2$ represent hydrogen or lower alkyl group or the phenyl radical which may carry a methyl, methoxy or ethoxy group, $R_3$ is hydrogen or a methyl group and $X^{(-)}$ an anion whose dyestuff content ranges, for example from 25 to 40 percent by weight are obtained when using for their preparation the hydrochlorides of said dyestuffs and polyglycols of high molecular weight. The anion $X^{(-)}$ stands for a halogen ion, preferably a chlorine ion.

As high molecular weight polyglycols for example polyethylene glycols having a molecular weight in the range of about 500 to about 5,000 are suited.

The high molecular weight polyglycols are advantageously added in an amount of about 2 to 20 percent calculated on the weight of the dyestuff. Hereinafter some basic oxazine dyestuffs which are appropriate for preparing the solutions of the invention are listed in the form of their hydrochlorides.

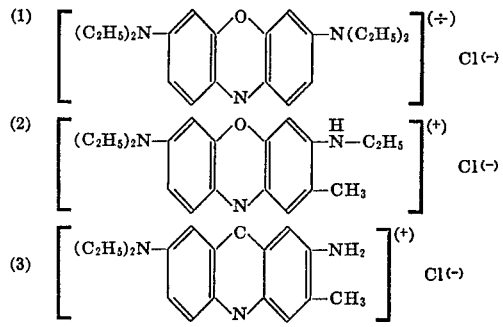

For that purpose either dyestuff presscakes obtained as chlorozinc double salts or trichlorozincates or as hydrochlorides are used. By a treatment with ammonium carbonate or by adding to the color base hydrochloric acid the chlorozinc double salts or trichlorozincates may be converted into the hydrochlorides. By a subsequent evaporation the solutions are adjusted to the desired concentration degree.

The solutions of the invention may be mixed with water at any ratio. The properties of the concentrated solutions obtainable by the instant process permit a volumetric dosage of the dyestuff.

Besides their adequacy for the preparation of dyeing solutions employed in the paper or cardboard-producing industry the dyestuffs of the above-identified general formula are, in particular, suitable for the coloration or printing of fibrous polyacrylonitrile materials.

The following examples are to illustrate the invention but they are not intended to limit it thereto the parts and percentages being by weight unless otherwise stated.

Example 1

Forty parts of dyestuff 1 of the preceding table (in form of the chlorozinc double salt) were dissolved, while heated, in 360 parts of water. Then about 8.5 parts of ammonium carbonate were slowly introduced at 60° C. (pH ranging from 7.2 to 7.5) until no more zinc carbonate precipitated. Therefore, the precipitated zinc carbonate was separated by filtration, about 1 part of polyethylene glycol of a molecular weight of 2,000 was added to the reaction mixture, whereupon about 260 parts of water were distilled off in vacuo. A concentrated solution of the dyestuff hydrochloride was obtained 100 parts of which provided an equal tinctorial strength as 100 parts of the commercial product (the chlorozinc double salt powder) of the same dyestuff.

Example 2

Thirty parts of dyestuff 2 of the preceding table (in form of the chlorozinc double salt) were dissolved in 280 parts of water while heated. Then about 7 parts of ammonium carbonate were slowly introduced at 60° C. (pH ranging from 7.2 to 7.3) until no more zinc carbonate precipitated.

The precipitated zinc carbonate was, subsequently, removed by filtration, about 1 part of a polyethylene glycol of a molecular weight of 1,000 was added to the reaction mixture, whereupon about 200 parts of water were distilled off in vacuo. A concentrated solution of the dyestuff hydrochloride was obtained 100 parts of which corresponded in regard to tinctorial strength to 100 parts of the commercial product (the chlorozinc double salt powder) of the same dyestuff.

EXAMPLE 3

Twenty five parts of dyestuff 3 of the preceding table (in form of the chlorozinc double salt) were dissolved, while heated, in 230 parts of water. Then about 6 parts of ammonium carbonate were slowly introduced at 60° C. (pH ranging from 7.1 to 7.2) until no more zinc carbonate precipitated.

The precipitated zinc carbonate was, subsequently, removed by filtration, about 1 part of a polyethylene glycol of a molecular weight of 5,000 was added to the mixture, whereupon 150 parts of water were distilled off in vacuo. A concentrated solution of the dyestuff hydrochloride was obtained 100 parts of which corresponded in regard to tinctorial strength to 100 parts of the commercial product (the chlorozinc double salt powder) of the same dyestuff.

We claim:

1. A stable, concentrated, aqueous solution of a basic oxazine dyestuff of the formula

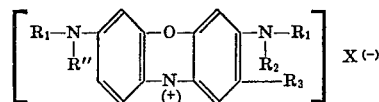

wherein R' and R" each is a lower alkyl group, $R_1$ and $R_2$ each is a hydrogen atom, a lower alkyl group, a phenyl group or a methyl-, methoxy- or ethoxy-substituted phenyl, $R_3$ is a hydrogen atom or a methyl group and X is a halogen ion, which solution consists essentially of from about 25 to about 40 percent by weight of said solution of a hydrochloride of said oxazine dyestuff, and from about 2 to about 20 percent by weight of said dyestuff of polyethylene glycol having a molecular weight of about 500 to about 5,000.

2. A solution according to claim 1 wherein said polyethylene glycol has a molecular weight of about 1,000 to about 5,000.